(12) United States Patent
Bhardwaj et al.

(10) Patent No.: US 10,937,068 B2
(45) Date of Patent: Mar. 2, 2021

(54) ASSESSMENT OF DOCUMENTS RELATED TO DRUG DISCOVERY

(71) Applicant: Innoplexus AG, Eschborn (DE)

(72) Inventors: Gunjan Bhardwaj, Koenigstein (DE); Abhijit Keskar, Pune (IN); Tanay Gahlot, Ponda Goa (IN)

(73) Assignee: Innoplexus AG, Eschborn (DE)

( * ) Notice: Subject to any disclaimer, the term of this patent is extended or adjusted under 35 U.S.C. 154(b) by 0 days.

(21) Appl. No.: 16/010,478

(22) Filed: Jun. 17, 2018

(65) Prior Publication Data

US 2019/0333116 A1  Oct. 31, 2019

Related U.S. Application Data

(60) Provisional application No. 62/664,468, filed on Apr. 30, 2018.

(51) Int. Cl.
*G06Q 30/02* (2012.01)
*G06Q 10/00* (2012.01)
*G06Q 30/00* (2012.01)
*G06Q 30/06* (2012.01)
*G06F 40/30* (2020.01)

(52) U.S. Cl.
CPC ......... *G06Q 30/0278* (2013.01); *G06F 40/30* (2020.01)

(58) Field of Classification Search
CPC .................. G06Q 30/0278; G06F 17/2785
USPC ........................................... 705/1.1–912, 306
See application file for complete search history.

(56) References Cited

U.S. PATENT DOCUMENTS

| | | | |
|---|---|---|---|
| 2003/0225601 A1* | 12/2003 | Hayden | G06Q 40/08 705/7.23 |
| 2004/0093331 A1* | 5/2004 | Garner | G06N 5/022 |
| 2009/0012842 A1* | 1/2009 | Srinivasan | G06F 16/3344 705/12 |

(Continued)

*Primary Examiner* — Jonathan P Ouellette
(74) *Attorney, Agent, or Firm* — Ziegler IP Law Group, LLC

(57) ABSTRACT

Disclosed is a system and method for determining an assessment value of a document related to a current research work of researcher(s) in drug discovery. Information pertaining to the document is processed to identify entities and semantic inter-relationships specific to the current research work. Information indicative of entities and semantic inter-relationships specific to a previous research work of the researcher(s) is accessed, and is compared with the entities and the semantic inter-relationships specific to the current research work to determine an association factor indicative of an extent of an association between the current research work and the previous research work of the researcher(s). Information indicative of entities and semantic inter-relationships related to the technical field of the current research work is accessed, and is compared with the entities and the semantic inter-relationships specific to the current research work to determine a status factor indicative of a novelty of the document with respect to the knowledge available publicly. The assessment value of the document is then determined based at least upon the association factor and the status factor. The assessment value may, for example, be determined in a crypto-currency for enabling future transactions of the document using a blockchain.

26 Claims, 10 Drawing Sheets

(56) References Cited

U.S. PATENT DOCUMENTS

| | | | |
|---|---|---|---|
| 2013/0138478 A1* | 5/2013 | Hyde | G06F 16/212 705/7.33 |
| 2014/0164008 A1* | 6/2014 | Gordon | G06Q 30/018 705/2 |
| 2014/0337306 A1* | 11/2014 | Gramatica | G06F 17/2785 707/706 |
| 2015/0052156 A1* | 2/2015 | Wang | G06F 16/382 707/751 |
| 2015/0193520 A1* | 7/2015 | Lee | G06Q 10/10 707/751 |
| 2017/0075877 A1* | 3/2017 | Lepeltier | G06F 17/2705 |
| 2018/0025303 A1* | 1/2018 | Janz | G06Q 10/0639 705/2 |
| 2018/0082183 A1* | 3/2018 | Hertz | G06F 16/9024 |
| 2018/0165720 A1* | 6/2018 | Barkeloo | G06Q 30/02 |
| 2019/0148019 A1* | 5/2019 | Bundschus | A61B 5/7264 705/2 |

* cited by examiner

Information Required

| Researcher(s) | Experiment Type |
| --- | --- |
| Research Field | Protocol Used |
| Department | Technique Used |
| Stage Relevance | Materials Used |
| Statistical Significance | Highlights |

Summary

Keywords

OK  Cancel

FIG. 2A

Submit New Documents

| Document | Purpose |
|---|---|
| Summary Report.pdf | |
| Graph.xls | |
| Shelx.jpg | |

[ OK ] [ Cancel ]

FIG. 2B

ASSESSMENT OF DOCUMENTS RELATED TO DRUG DISCOVERY

CROSS-REFERENCE TO RELATED APPLICATIONS

This is a non-provisional patent application based upon a provisional patent application no. U.S. 62/664,468 as filed on Apr. 30, 2018, which is herein incorporated by reference in its entirety, and claims priority under 35 U.S.C. 199(e).

TECHNICAL FIELD

The present disclosure relates generally to processing and assessment of documents pertaining to a research field, and more specifically, to systems for determining assessment values of documents, for example, pertaining to drug discovery. Moreover, the present disclosure concerns methods for determining assessment values of documents. Furthermore, the present disclosure also concerns computer program products for determining assessment values of documents, the computer program products comprising non-transitory machine-readable data storage media having stored thereon program instructions that, when accessed by a processing device cause the processing device to implement the aforementioned methods.

BACKGROUND

The advent of the Internet age opened up a whole new world of possibilities with regard to information sharing, and in particular, sharing of technical information. Millions of documents pertaining to years of research are available online. However, the mere abundance of information may be mind-boggling. With so much information available, it is difficult to determine what information is sufficiently important in a specific scenario.

Published research has become a significant factor in scientific dialogue. Pharmacologists and other researchers are no longer the only readers of medical studies. Patients and their families and friends now access medical literature regularly. Therefore, it is important to review research documents for authenticity and credibility.

Conventionally such reviews are performed manually by domain experts, for example, in the form of peer reviews. In general, peer review techniques are time consuming, and there are concerns regarding their reliability. Peer reviews vary significantly from journal to journal with no universally-accepted process. There are valid concerns regarding reviewer bias, implicit bias against women, institute bias and so forth. In this regard, there exists a need for a system that technically assesses a research document without bias, while also consuming less time.

As an example, drug development processes of pharmaceutical companies takes over a decade and often costs billions of dollars. A drug development process includes several stages, for example such as, a drug discovery stage, a pre-clinical stage and a clinical stage. At times, the pharmaceutical companies end up doing experiments that have been already done by some other research organizations (or personnel). The pharmaceutical companies are unaware of such experiments, as findings of these experiments are often not published, and therefore, are not available in the public domain. Typically, an experiment does not get published, when one of the following happens:

the experiment has failed to prove a hypothesis, that is, the hypothesis is proven to be false, the direction of a research organization (where the experiment was performed) has changed, post the experiment, or the experiment has been done in an academic setting (for example, for a doctorate thesis).

Currently, even if a research organization is interested in sharing its unpublished experimental findings with others, there is no real-time mechanism for a fair assessment of a document that includes details of the experimental findings. This hampers the research organization's ability to share its experimental findings with other research organizations and pharmaceutical companies. As a result, the whole pharmaceutical community ends up working in silos, at times re-doing the same experiment, which has already been done by other research organizations. This leads to longer drug development cycles, as the pharmaceutical companies end up re-inventing the wheel.

Conventionally, online journals (like Elsevier®) provide access to published documents on a subscription-basis. The pricing of these subscriptions is independent of the value of individual documents. Moreover, such journals only deal with the published documents, but do not deal with unpublished information.

SUMMARY

The present disclosure seeks to provide a system for determining an assessment value of a document. The present disclosure also seeks to provide a method for determining an assessment value of a document.

In a first aspect, an embodiment of the present disclosure provides a system configured to determine an assessment value of a document, the document being related to a current research work of one or more researchers, the system comprising a server arrangement comprising a processor communicably coupled via a data communication network with a client device, wherein the processor of the server arrangement is configured to execute machine readable instructions that cause the server arrangement to:

obtain, from the client device, information pertaining to the document, and process the information pertaining to the document to identify a technical field of the current research work and to identify entities and semantic inter-relationships specific to the current research work;

access information indicative of entities and semantic inter-relationships specific to a previous research work of at least one of the one or more researchers;

compare the entities and the semantic inter-relationships specific to the current research work with the entities and the semantic inter-relationships specific to the previous research work to determine an association factor indicative of one or more of: an existence of and/or an extent of an association between the current research work and the previous research work of the one or more researchers;

access information indicative of entities and semantic inter-relationships related to the technical field of the current research work;

compare the entities and the semantic inter-relationships specific to the current research work with the entities and the semantic inter-relationships related to the technical field to determine a status factor associated with the document, wherein the status factor is related to a novelty of the document with respect to the knowledge available publicly; and determine the assessment value of the document, based at least upon the association factor and the status factor.

In a second aspect, an embodiment of the present disclosure provides a method of determining an assessment value of a document, the document being related to a current research work of one or more researchers, the method being implemented via a computer system, the computer system comprising a server arrangement comprising a processor communicably coupled via a data communication network with a client device, the method comprising:

obtaining, from the client device, information pertaining to the document, and processing the information pertaining to the document to identify a technical field of the current research work and to identify entities and semantic inter-relationships specific to the current research work;

accessing information indicative of entities and semantic inter-relationships specific to a previous research work of at least one of the one or more researchers;

comparing the entities and the semantic inter-relationships specific to the current research work with the entities and the semantic inter-relationships specific to the previous research work to determine an association factor indicative of one or more of: an existence of and/or an extent of an association between the current research work and the previous research work of the one or more researchers;

accessing information indicative of entities and semantic inter-relationships related to the technical field of the current research work;

comparing the entities and the semantic inter-relationships specific to the current research work with the entities and the semantic inter-relationships related to the technical field to determine a status factor associated with the document, wherein the status factor is related to a novelty of the document with respect to the knowledge available publicly; and determining the assessment value of the document, based at least upon the association factor and the status factor.

In a third aspect, an embodiment of the present disclosure provides a computer program product for determining an assessment value of a document, wherein the document is related to a current research work of one or more researchers, the computer program product comprising a non-transitory machine-readable data storage medium having stored thereon program instructions that, when accessed by a processing device, cause the processing device to:

obtain information pertaining to the document, and process the information pertaining to the document to identify a technical field of the current research work and to identify entities and semantic inter-relationships specific to the current research work;

access information indicative of entities and semantic inter-relationships specific to a previous research work of at least one of the one or more researchers;

compare the entities and the semantic inter-relationships specific to the current research work with the entities and the semantic inter-relationships specific to the previous research work to determine an association factor indicative of one or more of: an existence of and/or an extent of association between the current research work and the previous research work of the one or more researchers;

access information indicative of entities and semantic inter-relationships related to the technical field of the current research work;

compare the entities and the semantic inter-relationships specific to the current research work with the entities and the semantic inter-relationships related to the technical field to determine a status factor associated with the document, wherein the status factor is related to a novelty of the document with respect to the knowledge available publicly; and determine the assessment value of the document, based at least upon the association factor and the status factor.

Embodiments of the present disclosure substantially eliminate or at least partially address the aforementioned problems in the prior art, and enable real-time or near real-time assessment of documents.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 2A and 2B are example views of a graphical user interface that are presented to a user, in accordance with an embodiment of the present disclosure;

Figure 1:
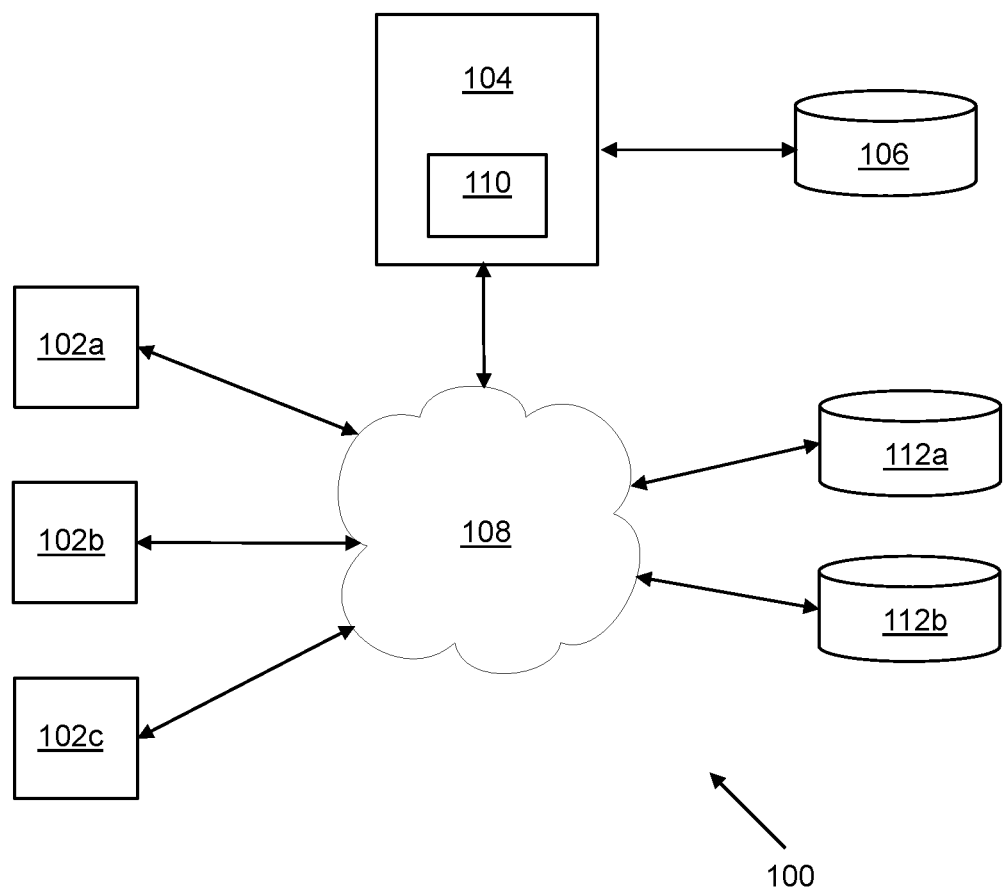
FIG. 1 is a schematic illustration of a network environment in which a system configured to determine an assessment value of a document is implemented pursuant to embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system configured to determine an assessment value of a document, the document being related to a current research work of one or more researchers, the system comprising a server arrangement comprising a processor communicably coupled via a data communication network with a client device, wherein the processor of the server arrangement is configured to execute machine readable instructions that cause the server arrangement to:

obtain, from the client device, information pertaining to the document, and process the information pertaining to the document to identify a technical field of the current research work and to identify entities and semantic inter-relationships specific to the current research work;

access information indicative of entities and semantic inter-relationships specific to a previous research work of at least one of the one or more researchers;

compare the entities and the semantic inter-relationships specific to the current research work with the entities and the semantic inter-relationships specific to the previous research work to determine an association factor indicative of one or more of: an existence of and/or an extent of an association between the current research work and the previous research work of the one or more researchers;

access information indicative of entities and semantic inter-relationships related to the technical field of the current research work;

compare the entities and the semantic inter-relationships specific to the current research work with the entities and the semantic inter-relationships related to the technical field to determine a status factor associated with the document, wherein the status factor is related to a novelty of the document with respect to the knowledge available publicly; and determine the assessment value of the document, based at least upon the association factor and the status factor.

Embodiments of the present disclosure are of advantage in that the aforesaid system is capable of determining the assessment value of the document in real-time or near real-time.

Pursuant to embodiments of the present disclosure, the document is an unpublished document. By determining the assessment value of the document, the aforementioned system provides a user with a guidance for pricing the document for selling the document to interested parties.

Throughout the present disclosure, the term "document" refers to a set of files in which an observation made in a scientific investigation or experiment is recorded, wherein the observation can be recorded in a form of one or more types of data. Some examples of various types of data are text data, tabular data, image data, video data and audio data. Thus, files can be in any suitable file formats depending upon the type of data that is stored therein. As an example, the set of files could comprise a single file having one or more of: a written text, one or more tables, one or more graphs, or a set of images. As another example, the set of files could comprise a plurality of files having different types of data, for example, such as a written text, one or more tables, one or more graphs, a set of images, one or more videos, or one or more audio clips.

Optionally, the server arrangement comprises one or more servers. Throughout the present disclosure, the term "server" generally refers to a device executing an application, program, or process in a client/server relationship that responds to requests for information or services by another application, program, process or device (namely, a client) on a data communication network.

The term "client device" generally refers to a device executing an application, program, or process in a client/server relationship that requests information or services from another application, program, process or device (namely, a server) on a data communication network. Importantly, the terms "client" and "server" are relative, as an application may be a client to one application but a server to another application. Throughout the present disclosure, the term "client device" refers to a device associated with a user that acts a client to the server arrangement in a client/server relationship, wherein such a device can be a personal device of the user or a server in a local environment of the user (for example, such as an internal server of a research organization where the current research work has been performed).

It will be appreciated that a user associated with the client device can be any of the one or more researchers, a representative of the one or more researchers or an owner of the document. Beneficially, the user is presented with a graphical user interface, via the client device.

Optionally, the graphical user interface is provided in a form of a web form that allows the user to provide the information pertaining to the document. Alternatively, optionally, the graphical user interface is provided by way of a trusted software application that, when executed at the client device, allows the user to select the document. The selected document is then processed to extract the information pertaining to the document, at the server arrangement or at the client device. Optionally, in this regard, the processing of the selected document is performed at the client device, based upon user's preferences. It will be appreciated that the user may not prefer to deliver the document to the server arrangement to avoid data theft and misuse by unauthorized parties.

Optionally, the trusted software application is received (for example, downloaded) at the client device from the server arrangement or a trusted third party. The trusted third party can be a publically-accessible digital distribution platform, for example, such as Google Play®, the App Store® (for iOS®) and the like.

As described above, the information pertaining to the document can be either extracted from the document at the client device, and/or provided by the user.

Pursuant to an embodiment, the information pertaining to the document comprises at least one of: an abstract of the document, a hypothesis of the current research work, a brief note provided as an input by the user, or any set of information, which is indicative of entities and semantic inter-relationships between the entities as mentioned in the document. Alternatively, optionally, the information pertaining to the document comprises the document. It will be appreciated that the system pursuant to embodiments of the present disclosure is capable of determining the assessment value of the document, even when the document is not submitted to the server arrangement. In other words, the aforementioned system is capable of determining the assessment value of the document, merely from the information pertaining to the document, without a need to submit the document.

Optionally, the technical field of the document is related to drug discovery. Optionally, for a given document related to drug discovery, information pertaining to the given document is indicative of a drug, a pathway, a target and a disease as entities and is also indicative of semantic inter-relationships between the entities. In such a case, the information pertaining to the given document is typically in a form of one or more sentences or phrases in a natural language.

Optionally, the information pertaining to the document is processed by employing a frame semantic parsing technique to generate semantic frames. Optionally, in this regard, the frame semantic parsing technique employs a directed acyclic transition-based recurrent neural network. Optionally, the frame semantic parsing technique employs an ontology stored in an ontology databank associated with the server arrangement.

Beneficially, the frame semantic parsing technique identifies the entities and their semantic inter-relationships even when the entities and their semantic inter-relationships may be defined very subjectively in the information pertaining to the document.

These semantic frames are indicative of the entities and the semantic inter-relationships specific to the current research work. Optionally, the semantic frames are also indicative of the technical field of the current research work.

Beneficially, a semantic inter-relationship between two given entities is indicative of a causal relationship between the two given entities. As an example, in drug discovery, examples of a causal relationship between a drug and a disease could be "causes", "inhibits", "catalyzes" and so on.

Optionally, a plurality of types of causal relationships are pre-defined, and the processor of the server arrangement is configured to execute machine readable instructions that cause the server arrangement to classify the semantic inter-relationships according to the plurality of types of causal relationships.

In the frame semantic parsing technique, sentences or phrases in a natural language are parsed and processed to generate semantic frames. In other words, lexical targets (namely, words and phrases) in their sentential contexts are processed to generate the semantic frames. Herein, the term "semantic frame" refers to a collection of facts or a coherent structure of related concepts that specify features that are typically associated with a particular word (for example, attributes, functions and interactions of a particular entity). As an example, a semantic frame observed in research work related to drug discovery could include at least two of: a drug, a pathway, a target, a disease.

Such a frame semantic parsing technique is optionally implemented using known techniques/model, for example as described in a published paper, titled "SLING: A framework for frame semantic parsing" (Michael Ringgaard et. al., available here https://arxiv.org/abs/1710.07032).

For illustration purposes only, there will now be considered an example document, whose summary, obtained as information pertaining to the example document, is as follows:

"This experiment was carried out in vivo to check if IL1b mRNA did not show any change in Cortex and Hippocampi. All LPS-induced changes were restored in 70 day old rats. 5 PUPs were treated with Saline and LPS (IP 2 mg/kg). mRNA level of pro-inflammatory cytokine (IL1b) was examined. Found that IL1b mRNA was left significantly unregulated in Substantia nigra. Further experiments like WB, ELISA were also conducted."

The summary of the example document (namely, the information pertaining to the example document) is processed to identify entities and their semantic inter-relationships, wherein the entities and their types are identified as follows:
Drug: LPS
Disease: pro-inflammatory cytokine
Target: Cortex and Hippocampi An inference from the summary can be made as follows: It was found that at the concentration levels of the drug (mentioned in the summary), LPS had no effect on the translation of cytokines. Therefore, the semantic inter-relationships can be represented as follows:
LPS—no effect—Cytokine Furthermore, apart from the information pertaining to the document, the processor of the server arrangement is configured to execute machine readable instructions that cause the server arrangement to obtain, from the client device, metainformation pertaining to the document. Optionally, in this regard, the aforementioned graphical user interface allows the user to input the aforementioned metainformation.

Optionally, said metainformation comprises information about one or more of: names of the one or more researchers, name of a research organization where the current research work has been performed, a statistical significance of the current research work, a set of keywords associated with the current research work, one or more research fields to which the current research work pertains, a hypothesis of the current research work, an experiment performed during the current research work, a stage of drug development to which the current research work is applicable. Additionally, optionally, the metainformation also comprises information pertaining to cost incurred in the current research work of the one or more researchers.

As an example, for a given document related to drug discovery, some examples of the one or more research fields may include neurobiology, cardiology, oncology, virology, biophysics, immunology and so forth.

Optionally, the information about the experiment performed during the current research work is indicative of at least one of: a type of experiment performed during the current research work, highlights of the experiment, a protocol used for performing the experiment, key raw materials and/or instruments used for performing the experiment, a technique used for performing the experiment, a sample size of the experiment, a development stage to which the current research work is applicable, a date of completion of the experiment, a duration of the experiment.

For a given document related to drug discovery, some examples of the type of experiment can be gene expression analysis with high throughput RNA sequencing, gene expression analysis with microarray, protein expression study western blot, protein immune-precipitation technique for protein-protein interaction study, protein localization study with Confocal Laser Scanning Microscopy (CLSM), and so forth. Likewise, with respect to drug discovery, some examples of the protocol can be mRNA level analysis, mRNA level analysis, tRNA level analysis, sRNA level analysis, snRNA level analysis and so forth. Similarly, with respect to drug discovery, some examples of the key raw materials can be lipopolysaccharide, epitope-specific binders, membrane proteins, immunoglobulins, beta-mercaptoethanol, glycoproteins, CD-9 antibodies, CD-81 antibodies, stem cells, and heat shock proteins. Likewise, with respect to drug discovery, some examples of the highlights of the experiment can be as follows:

Long noncoding RNA Linc00152 functions as a tumor propellant in pan-cancer,

Galectin-1 is an interactive protein of selenoprotein M in the brain,

GPR182 is a novel marker for sinusoidal endothelial differentiation,

Expression and sub cellular localization of APOBEC3G in peripheral blood mononuclear, Overexpression of NEK3 is associated with poor prognosis in patients with gastric cancer, and so forth.

For drug discovery, the development stage could be a stage of drug development to which the current research work is applicable. As an example, with respect to drug discovery, the development stage can be any of: a drug discovery stage, a pre-clinical stage, a clinical stage and a post-approval stage.

Moreover, optionally, the processor of the server arrangement is configured to execute machine readable instructions that cause the server arrangement to provide the user, via the graphical user interface of the client device, with a Single Sign-On (SSO) feature, based on stored credentials of the user. Optionally, the graphical user interface of the client device allows the user to input his/her credentials (for example, a user identification and a password) to complete a sign-in procedure. Additionally, optionally, the graphical user interface of the client device allows the user to store such credentials on the client device, thereby allowing the user to sign-in without a need to input the credentials.

Beneficially, the processor of the server arrangement is configured to execute machine readable instructions that cause the server arrangement to authenticate the user prior to allowing the user to provide the information pertaining to the document. This potentially prevents an unauthorized party from masquerading as the user.

Optionally, during an initial sign-up procedure, the user is required to provide one-time information. More optionally, the one-time information includes information about the one or more researchers.

Optionally, the information about the one or more researchers is indicative of at least one of: names or unique identifiers of the one or more researchers, academic qualifications of the one or more researchers, academic institutes from where the one or more researchers obtained the academic qualifications, research organizations and/or departments to which the one or more researchers are currently affiliated, areas of expertise of the one or more researchers, areas of interest of the one or more researchers, digital libraries where the one or more researchers have made publications.

Optionally, the processor of the server arrangement is configured to execute machine readable instructions that cause the server arrangement to process the aforementioned metainformation to verify the technical field of the current research work. This is particularly applicable in cases where the metainformation includes the information about the one or more research fields to which the current research work pertains.

Moreover, optionally, the processor of the server arrangement is configured to execute machine readable instructions that cause the server arrangement to access the information indicative of the entities and the semantic inter-relationships specific to the previous research work of the at least one of the one or more researchers, based upon the information about the one or more researchers (namely, a part of the aforementioned metainformation).

Optionally, in this regard, the processor of the server arrangement is configured to execute machine readable instructions that cause the server arrangement to:

obtain, from a plurality of database servers, other documents authored by the at least one of the one or more researchers;

process the other documents to identify the entities and the semantic inter-relationships specific to the previous research work; and store the information indicative of the entities and the semantic inter-relationships specific to the previous research work.

Hereinabove, the term "database servers" refers to database servers related to a plurality of digital libraries that publish technical documents authored by various researchers or research organizations, while the term "other documents" refers to all the documents authored or co-authored previously (namely, prior to the current research work) by the at least one of the one or more researchers that are available in the public domain, and therefore, represent the previous research work of the one or more researchers. Such published technical documents may, for example, be pre-clinical reports, clinical reports, scientific articles, theses, granted patents, published patent applications and so on.

With respect to drug discovery, some examples of such digital libraries are New England Journal of Medicine (NEJM), The Lancet, Journal of the American Medical Association, Annals of Internal Medicine, The British Medical Journal, Elsevier® and Pubmed.

Optionally, in order to obtain the other documents, the plurality of database servers are queried using names or other unique identifiers of the one or more researchers (as obtained from the information about the one or more researchers).

Optionally, when processing a given other document, different sections of the given other document are identified and at least one of the different sections of the given other document is further processed to identify the entities and the semantic inter-relationships specific to the previous research work. It will be appreciated that technical documents typically have well-defined sections that can be identified from their respective headings, and therefore, it is possible to select at least one of these sections for further processing. As an example, a scientific report related to an experiment may include various sections having suitable headings, for example, such as 'Abstract', 'Introduction', 'Materials and Methods', 'Results', 'Discussion', 'Conclusion' and 'References'. In such a case, the section(s) 'Abstract' and/or 'Conclusion' may be further processed to identify entities and semantic inter-relationships mentioned in the scientific report. As another example, a patent document typically includes sections having headings, for example, such as 'Abstract', 'Background', 'Summary', 'Brief Description of Drawings', 'Detailed Description' and 'Claims'. In such a case, the section(s) 'Abstract' and/or 'Claims' may be further processed to identify entities and semantic inter-relationships mentioned in the patent document.

Optionally, the other documents are processed by employing the aforementioned frame semantic parsing technique to generate corresponding semantic frames. Optionally, in such a case, sentences present in at least one section of each of the other documents are parsed and processed to generate the semantic frames. Optionally, these semantic frames form a part of the information indicative of the entities and the semantic inter-relationships specific to the previous research work.

Optionally, the information indicative of the entities and the semantic inter-relationships specific to the previous research work is stored at a data repository of the server arrangement. Optionally, the data repository is implemented by way of data memory associated with the processor of the server arrangement. Alternatively, optionally, the data repository is implemented by way of a database arrangement associated with the server arrangement, wherein the database arrangement comprises one or more databases.

Optionally, the other documents are obtained and processed even before the information pertaining to the document is obtained from the client device. It will be appreciated that the other documents can be obtained and processed after the initial sign-up procedure.

Optionally, the processor of the server arrangement is configured to execute machine readable instructions that cause the server arrangement to compare the entities and the semantic inter-relationships specific to the current research work with the entities and the semantic inter-relationships specific to the previous research work by identifying any common entities and semantic inter-relationships between the current research work and the previous research work, and any new entities and/or any new semantic inter-relationships in the current research work with respect to the previous research work.

Furthermore, optionally, the processor of the server arrangement is configured to execute machine readable instructions that cause the server arrangement to:

obtain, from a plurality of database servers, a plurality of documents pertaining to the technical field of the current research work;

process the plurality of documents to identify the entities and the semantic inter-relationships related to the technical field; and store the information indicative of the entities and the semantic inter-relationships related to the technical field.

Optionally, in order to obtain the plurality of documents pertaining to the technical field of the current research work, the plurality of database servers are queried using key words (namely, key strings) that are relevant to the technical field. Hereinabove, the term "database servers" refers to the database servers related to the plurality of digital libraries that publish technical documents authored by various researchers or research organizations, while the term "plurality of documents" refers to all the documents pertaining to the technical field that are available in the public domain, and therefore, represent knowledge available publicly.

Optionally, when processing a given document, different sections of the given document are identified and at least one of the different sections of the given document is further processed to identify the entities and the semantic inter-relationships related to the technical field. Optionally, the plurality of documents are processed by employing the aforementioned frame semantic parsing technique to generate corresponding semantic frames. Optionally, in such a case, sentences present in at least one section of each of the plurality of documents are parsed and processed to generate the semantic frames. Optionally, these semantic frames form a part of the information indicative of the entities and the semantic inter-relationships related to the technical field.

Optionally, the information indicative of the entities and the semantic inter-relationships related to the technical field is stored at the aforementioned data repository or another data repository of the server arrangement.

Optionally, the plurality of documents are obtained and processed even before the aforementioned information pertaining to the document is obtained from the client device. Optionally, in this regard, documents are obtained and processed for a plurality of technical fields; for each technical field, information indicative of entities and semantic inter-relationships related to that technical field is stored and updated from time to time.

Optionally, the processor of the server arrangement is configured to execute machine readable instructions that cause the server arrangement to compare the entities and the semantic inter-relationships specific to the current research work with the entities and the semantic inter-relationships related to the technical field by identifying any common entities and semantic inter-relationships therebetween and any new entities and/or any new semantic inter-relationships in the current research work with respect to the knowledge available publicly in the technical field.

Optionally, in this regard, the processor of the server arrangement is configured to execute machine readable instructions that cause the server arrangement to:

generate a current-work graph representing the entities and the semantic inter-relationships specific to the current research work;

generate a knowledge graph representing the entities and the semantic inter-relationships related to the technical field of the current research work, based upon the information indicative of the entities and the semantic inter-relationships related to the technical field of the current research work;

generate a previous-work graph representing the entities and the semantic inter-relationships specific to the previous research work, based upon the information indicative of the entities and the semantic inter-relationships specific to the previous research work of the at least one of the one or more researchers; and perform said comparisons using the current-work graph, the previous-work graph and the knowledge graph.

Optionally, in this regard, the aforementioned graphs are generated from their corresponding semantic frames that have been generated using the aforementioned frame semantic parsing technique. Optionally, in this regard, a given graph is generated by linking the identified entities according to the identified semantic inter-relationships between them. In the given graph, the entities are represented by nodes of the given graph, while the semantic inter-relationships between the entities are represented by edges (namely, links) between the nodes.

Optionally, one or more of the aforementioned graphs are stored in the database arrangement associated with the server arrangement. Alternatively, optionally, one or more of the aforementioned graphs are stored in the data memory associated with the processor of the server arrangement. Optionally, in such a case, the one or more of the aforementioned graphs are stored in a form of adjacency lists or adjacency matrices.

Optionally, the processor of the server arrangement is configured to execute machine readable instructions that cause the server arrangement to assign weights to the semantic inter-relationships related to the technical field, based upon at least one of: types of causal relationships represented by the semantic inter-relationships between the entities, the number of documents in which the semantic inter-relationships occurred, ranks of digital libraries where the documents were published.

Optionally, the processor of the server arrangement is configured to execute machine readable instructions that cause the server arrangement to assign weights to the semantic inter-relationships specific to the previous research work, based upon at least one of: types of causal relationships represented by the semantic inter-relationships between the entities, the number of documents authored by the at least one of the one or more researchers in which the semantic inter-relationships occurred, ranks of digital libraries where the documents were published.

It will be appreciated that documents related to highly-important research work are more likely to be published in highly ranked digital libraries. As an example, journals of international repute (for example, such as New England Journal of Medicine (NEJM) and Nature) are likely to publish technical documents that are authentic and highly important. Therefore, ranking of the digital libraries is an important factor in the weight assignment.

Moreover, it will be appreciated that a same document may be published in different digital libraries. Optionally, in this regard, a publication made in a digital library having the highest ranking, from amongst the different digital libraries, is considered. Alternatively, optionally, in this regard, all publications of the same document are taken into consideration to calculate a consolidated ranking of the digital libraries in which these publications were made. As an example, the consolidated ranking can be calculated as an average of the ranks of the digital libraries in which these publications were made.

Optionally, in this regard, the processor of the server arrangement is configured to execute machine readable instructions that cause the server arrangement to obtain, from at least one server, information about individual ranks of the digital libraries, and to normalize the ranks of the digital libraries based upon a suitable normalization scheme.

Optionally, the weights lie between 0 and 1.

For illustration purposes only, there will now be considered an example formula for assigning the weights, as follows:

$$W_{a,b,t} = \sum_{j \in D_{a,b,t}} Rj * \frac{1}{|Nd|},$$

wherein:

'$W_{a,b,t}$' represents a weight of a semantic inter-relationship between entities 'a' and 'b', wherein the semantic inter-relationship represents a causal relationship of a type 't', '$D_{a,b,t}$' represents a set of documents where the semantic inter-relationship occurred, '$R_j$' represents individual ranks of digital libraries where the documents of said set were published, wherein the ranks lie between 0 and 1, and '$|N_d|$' represents the number of documents in said set.

It will be appreciated that the weights of the semantic inter-relationships related to the technical field can be determined using other suitable techniques. As an example, for the knowledge graph, the weights can be determined using a technique described in a UK patent application GB1804894.2.

Optionally, the processor of the server arrangement is configured to execute machine readable instructions that cause the server arrangement to assign weights to the semantic inter-relationships specific to the current research work, based upon the weights of the semantic inter-relationships related to the technical field. Continuing from the previous example, the example formula can be modified to calculate the weights for common semantic inter-relationships as follows:

$$W_{a,b,t} = \left( \left( \sum_{j \in D_{a,b,t}} Rj \right) + R \right) * \frac{1}{(|Nd| + 1)},$$

wherein the number of documents is increased by one, and a rank of the research organization where the current research work has been performed is added to the sum of the ranks.

Optionally, the weights for new semantic inter-relationships are assigned based upon the rank of the research organization where the current research work has been performed. Alternatively, optionally, the new semantic inter-relationships may be assigned a weight of '1'.

Moreover, optionally, the comparison between the entities and the semantic inter-relationships specific to the current research work and the entities and the semantic inter-relationships specific to the previous research work is performed by comparing the current-work graph with the previous-work graph. In such a case, the association factor is determined based upon the comparison between the current-work graph and the previous-work graph. Optionally, in this regard, based upon said comparison, it is determined whether or not there exists any association between the current research work and the previous research work, and if there exists an association therebetween, what is the extent to which the current research work is associated with the previous research work.

Optionally, said comparison is performed by unifying the current-work graph and the previous-work graph into a unified graph, and identifying any common entities and semantic inter-relationships therein (namely, entities and semantic inter-relationships that are common between the current-work graph and the previous-work graph) and any new entities (namely, entities that exist in the current-work graph, but do not exist in the previous-work graph) and new semantic inter-relationships (namely, semantic inter-relationships that exist in the current-work graph, but do not exist in the previous-work graph). A potential interpretation of an existence of common node(s) is that the one or more researchers have worked on a similar technical subject matter in their previous research work, and therefore, are likely to have developed a deeper knowledge and understanding in the technical subject matter. Likewise, a potential interpretation of an existence of new node(s) in addition to the common node(s) is that the current research work is a progression of the previous research work.

As an example, a particular researcher, who has been working on drug discovery for lung cancer, may have authored and published his/her previous research work, such that the previous-work graph includes drugs 'A', 'B' and 'C', their corresponding pathways, a target 'EGFR' and the disease 'lung cancer' as entities. In such a case, if the current-work graph includes a drug 'D', its corresponding pathway, the target 'EGFR' and the disease 'lung cancer' as entities, then the drug 'D' and its corresponding pathway would be identified as new entities. A potential interpretation of the existence of such new entities is that the particular researcher has been performing experiments to study the effect of various drugs on the disease 'lung cancer', and therefore, his/her current research work is likely to be significantly important. In other words, an existence of new entities in connection with common entities potentially indicate a deeper knowledge and understanding of the particular researcher in the drug discovery for lung cancer, and therefore, the current research work of the particular researcher is likely to be a further development and improvement over his/her previous research work.

In this way, the association factor is indicative of a likelihood of the one or more researchers arriving at the current research work, considering their previous research work.

Optionally, the association factor is determined by:
calculating, for each semantic inter-relationship specific to the current research work (namely, a particular edge of the current-work graph), a probability of that semantic inter-relationship, given the semantic inter-relationships specific to the previous research work (namely, a probability of the particular edge of the current-work graph, given the previous-work graph); and computing an average of the probabilities calculated for all the semantic inter-relationships specific to the current research work (namely, for all the edges of the current-work graph).

Optionally, in this regard, the probability of the particular edge of the current-work graph, given the previous-work graph, is calculated by employing a suitable link prediction technique. It will be appreciated that link prediction techniques are well-known in the art.

As an example, the aforementioned comparison can be mathematically represented as follows:

$$\forall i,j \in G_{Current\ work}$$

(namely, for all 'i' and 'j' belonging to the current-work graph), $$L(G_{Current\text{-}work} \mid G_{Previous\text{-}work}) = \frac{1}{|Ec|}(P(E_{i,j} \mid G_{Previous\text{-}work})),$$

wherein:
'G' represents a graph having vertices 'V' and edges 'E',
'$E_{i,j}$' represents an edge directed from a vertex '$V_i$' towards a vertex '$V_j$',
'$L(G_{Current\text{-}work}|G_{Previous\text{-}work})$' represents the likelihood of the one or more researchers arriving at the current research work, considering their previous research work,
'$|E_c|$' represents the number of edges in the current-work graph, and
'$P(E_{i,j}|G_{Previous\text{-}work})$' represents the probability of the edge '$E_{i,j}$' in the current work graph given the previous work graph.

Furthermore, optionally, the comparison between the entities and the semantic inter-relationships specific to the current research work and the entities and the semantic inter-relationships related to the technical field is performed by comparing the current-work graph with the knowledge graph. In such a case, the status factor is determined based upon the comparison between the current-work graph and the knowledge graph.

Optionally, in this regard, said comparison is performed by identifying common entities and semantic inter-relationships therein (namely, entities and semantic inter-relationships that are common between the current-work graph and the knowledge graph) and any new entities (namely, entities that exist in the current-work graph, but do not exist in the knowledge graph) and new semantic inter-relationships (namely, semantic inter-relationships that exist in the current-work graph, but do not exist in the knowledge graph). Notably, new node(s) and/or new semantic inter-relationship(s) potentially indicate that the current research work of the one or more researchers is significantly important.

The status factor is a measure of an actual contribution of the current research work of the one or more researchers to the knowledge available publicly, namely information that is being contributed and conveyed by the document. In other words, the status factor indicates how novel the findings of the current research work are with respect to the knowledge available publicly.

Optionally, the status factor is determined by:
calculating a probability of the current research work, given the knowledge available publicly, and
computing a measure of the information that is being contributed and conveyed by the document, based upon the calculated probability.

Optionally, the probability of the current research work, given the knowledge available publicly, is calculated by employing a suitable link prediction technique.

As an example, such comparison can be mathematically represented as follows:

$$\forall i,j \in G_{Current\ work}$$

(namely, for all 'i' and 'j' belonging to the current-work graph), $$P(G_{Current\text{-}work} \mid G_{Knowledge}) = \sum Wi, j * \frac{1}{|Ec|}$$

$$I = -\log(P(G_{Current\text{-}work}|G_{knowledge}))$$

wherein:
'$W_{i,j}$' represents a weight of an edge directed from a vertex '$V_i$' towards a vertex '$V_j$',
'$|E_c|$' represents the number of edges in the current-work graph,
'$P(G_{Current\text{-}work}|G_{Knowledge})$' represents the probability of the current research work, given the knowledge available publicly, and
'I' represents the measure of the information that is being contributed and conveyed by the document.

It will be appreciated that higher is the probability of the current research work given the knowledge available publicly, lower is the measure of the information that is being contributed and conveyed by the document. In other words, more probable is the current research work, lesser is its novelty.

Moreover, it will be appreciated that there may be no new node or semantic inter-relationship in the current-work graph as compared to the knowledge graph; however, the statistical significance of the hypothesis (whether proven or failed) of the current research work may be different from a previously-known statistical significance of the hypothesis (namely, known from the plurality of documents pertaining to the technical field).

Optionally, in a case where the statistical significance of the hypothesis of the current research work is different from the previously-known statistical significance of the hypothesis, the aforesaid comparison between the current-work graph and the knowledge graph takes into account a difference between the statistical significance of the hypothesis of the current research work and the previously-known statistical significance. Optionally, in this regard, the status factor is determined based upon said difference. As an example, if said difference exceeds a predefined threshold, it would imply that the current research work of the one or more researchers is important.

For illustration purposes only, there will now be considered some example scenarios to elucidate an impact of the aforementioned likelihood of the one or more researchers arriving at the current research work, considering their previous research work (namely, '$L(G_{Current\text{-}work}|G_{Previous\text{-}work})$') and the probability of the current research work given the knowledge available publicly (namely, '$P(G_{Current\text{-}work}|G_{Knowledge})$') on the assessment value.

Case 1:

$$L(G_{Current\text{-}work}|G_{Previous\text{-}work})=1; \text{ and } P(G_{Current\text{-}work}|G_{Knowledge})=1.$$

In this case, the assessment value would be low, as the current research work is not considered to be novel, given the knowledge available publicly, even when the current research work of the one or more researchers is an extension of their previous research work.

Case 2:

$$L(G_{Current\text{-}work}|G_{Previous\text{-}work})=0; \text{ and } P(G_{Current\text{-}work}|G_{Knowledge})=1.$$

In this case, the assessment value would again be low, as the current research work is not considered to be novel, given the knowledge available publicly.

Case 3:

$$L(G_{Current\text{-}work}|G_{Previous\text{-}work})=1; \text{ and } P(G_{Current\text{-}work}|G_{Knowledge})=0.$$

In this case, the assessment value would be very high, as the current research work is considered to be novel and groundbreaking, given the knowledge available publicly, and the current research work is an extension of the previous research work.

Case 4:

$$L(G_{Current\text{-}work}|G_{Previous\text{-}work})=0; \text{ and } P(G_{Current\text{-}work}|G_{Knowledge})=0.$$

In this case, the assessment value would be high, as the current research work is considered to be novel and groundbreaking, given the knowledge available publicly, even when the current research work is not an extension of the previous research work. It will be appreciated that these example scenarios have been provided merely to give a context to the reader.

Furthermore, optionally, the processor of the server arrangement is configured to execute machine readable instructions that cause the server arrangement to determine the assessment value of the document using at least one of: a statistical analysis, machine learning, or a rule-based analysis.

Optionally, the assessment value is determined using a neural network that is capable of supervised, semi-supervised or unsupervised learning. As an example, the neural network can be a Deep Neural Network (DNN) or a Probabilistic Neural Network (PNN).

Optionally, labeled training data is generated manually in an initial stage by domain experts (namely, experts in a given technical field), and is used to train the neural network. Pursuant to an embodiment of the present disclosure, the neural network used by the system is capable of learning from less data, for example, from thousands to tens of thousands of sample documents.

It will be appreciated that it is important to determine an uncertainty with which the neural network has predicted (namely, determined) the assessment value of the document. Optionally, in this regard, the processor of the server arrangement is configured to execute machine readable instructions that cause the server arrangement to determine a confidence score associated with the assessment value of the document to validate an accuracy of the assessment value. The confidence score is indicative of the uncertainty associated with the prediction of the assessment value.

Optionally, the confidence score is determined by employing a heteroscedastic model.

As an example, the confidence score associated with the assessment value is determined to be low, if the labeled training data used to train the neural network has not sufficiently covered the technical field of the current research work. In such a case, the assessment value of the document is determined manually by the domain experts manually, and the labeled training data is updated accordingly.

Thus, pursuant to an embodiment of the present disclosure, the aforementioned system is capable of quantifying the uncertainty associated with the prediction and enriching the labelled training data based upon the confidence score.

Moreover, optionally, the assessment value is a monetary value. Optionally, the assessment value is in a cryptocurrency for enabling future transactions of the document using a blockchain. It will be appreciated that the assessment value can alternatively be in any suitable currency, as required. Optionally, the assessment value provides the user with a guidance for pricing the document for selling the document to research organizations and/or pharmaceutical companies that are interested in buying the document.

Optionally, the processor of the server arrangement is configured to execute machine readable instructions that cause the server arrangement to:

process the information pertaining to the document and/or the metainformation pertaining to the document to identify one or more key words associated with the document; and store the one or more key words along with the assessment value and a unique identifier of the document.

Optionally, the processor of the server arrangement is configured to execute machine readable instructions that cause the server arrangement to:

receive a search query from a second client device, and process the search query to identify at least one key word pertaining to the search query;

construct a summarized view of the document, when the at least one key word matches at least one of the one or more key words associated with the document;

display, on a user interface of the second client device, the summarized view of the document; and receive from the second client device and validate a request for accessing the document;

process the request to cause the client device to allow the second client device to access the document, when the request has been validated successfully.

Hereinabove, the term "second client device" refers to a device associated with a consumer, for example, such as a research organization or a pharmaceutical company that may be interested in purchasing the document. Beneficially, the assessment value is indicative of a quantified importance of the current research work from a technical point of view. Thus, the assessment value can be used to provide a potential consumer with an insight into the current research work, and help the consumer in deciding whether or not to purchase the document.

Optionally, documents whose assessment values are determined using the aforementioned system are made available for purchase to potential consumers, via an online store or portal. Optionally, such online stores or portals provide a list of documents matching a search criterion of a consumer, and allow the consumer to sort the documents according to corresponding assessment values of the documents, via a graphical user interface.

Moreover, optionally, the processor of the server arrangement is configured to execute machine readable instructions that cause the server arrangement to:

obtain, from the client device or from at least one database server, the information about the one or more researchers;

process the information about the one or more researchers to determine a reputation factor associated with the document; and determine the assessment value of the document, based upon the reputation factor.

Optionally, the at least one database server comprises a database server coupled in communication with the server arrangement, wherein the database server is configured to obtain, from a plurality of database servers, information about researchers, and collate the information about the researchers based upon their field of research.

Additionally or alternatively, optionally, the at least one database server comprises a third-party database server that provides a professional networking service (namely, a business-oriented social networking service). Some examples of such professional networking services are LinkedIn, Fast Pitch and Konnects (these include registered trademarks).

As mentioned earlier, the information about the one or more researchers is optionally indicative of at least one of: the one or more researchers, the academic qualifications of the one or more researchers, the academic institutes from where the one or more researchers obtained the academic qualifications, the research organizations and/or departments to which the one or more researchers are currently affiliated, the areas of expertise of the one or more researchers, the areas of interest of the one or more researchers, digital libraries where the one or more researchers have made publications.

Optionally, the information about the one or more researchers is processed using a suitable exact inference technique.

Optionally, the information about the one or more researchers is processed using conditional probability distribution. As an example, a latent variable 'Education Background' can be determined from random variables such as 'Academic Institute', 'Academic Qualifications', and 'Area of Expertise' using the conditional probability distribution. Likewise, a latent variable 'Current Affiliation' can be determined from random variables such as 'Current Organization', 'Current Department' and 'Current Designation' using the conditional probability distribution. Similarly, a latent variable 'Publication' can be determined from random variables such as 'Congress', 'Patents' and 'Journal' using the conditional probability distribution. In the example, the reputation factor can then be determined from the latent variables 'Education Background', 'Current Affiliation' and 'Publication' using the conditional probability distribution.

Optionally, during the aforementioned processing of the information about the one or more researchers, rankings of the academic institutes, the research organizations and the digital libraries are taken into consideration.

Furthermore, optionally, the processor of the server arrangement is configured to execute machine readable instructions that cause the server arrangement to:

obtain, from the client device, the information pertaining to cost incurred in the current research work of the one or more researchers;

process the information pertaining to the cost to determine a cost factor associated with the document; and determine the assessment value of the document, based upon the cost factor.

As mentioned earlier, the information pertaining to the cost is optionally obtained as a part of the aforementioned metainformation. Optionally, the information pertaining to the cost comprises information about at least one of: consumables used in the current research work, instruments used in the current research work, a species on which the experiment has been performed, a type of a drug, a country or place of the current research work, the research organization where the current research work has been performed, the protocols used in the current research work.

Optionally, the information pertaining to the cost is processed using a Bayesian network. As an example, a latent variable 'Infrastructure Cost' can be determined from random variables such as 'Consumables', 'Instruments' and 'Country'; a latent variable 'Manual Labor' can be determined from random variables such as 'Country', 'Organization' and 'Protocol'; a latent variable 'Arrangement Cost' can be determined from a random variable such as 'Species' and 'Drug'. In the example, the cost factor can then be determined from the latent variables 'Infrastructure Cost', 'Manual Labor' and 'Arrangement Cost'.

It will be appreciated that the Bayesian network is particularly beneficial in cases where an exact cost of a certain item in a certain country is not known. In such cases, an approximate cost is estimated from other available data using the Bayesian network. As an example, if the current research work were performed in France using an X-ray diffraction device and the exact cost of the X-ray diffraction device in France is not known, the Bayesian network can be used to estimate the cost of the X-ray diffraction device from data available for another country. In such a case, if the cost of a certain experimental device is known in both France and Russia, the Bayesian network can be used to estimate the cost of the X-ray diffraction device in France.

Moreover, optionally, the processor of the server arrangement is configured to execute machine readable instructions that cause the server arrangement to:

obtain, from the client device, the information about the statistical significance of the current research work and the information about the research organization where the current research work has been performed;

process the information about the statistical significance, whilst taking into account a rank of the research organization, to determine a statistical-significance factor associated with the document; and determine the assessment value of the document, based upon the statistical-significance factor.

Throughout the present disclosure, the term "statistical significance" refers to a statistical measure of an extent to which the hypothesis of the current research work has been proven (or has failed) as a result of the current research work. It will be appreciated that experiments that have failed to prove a hypothesis (namely, the experiments in which the hypothesis is proven to be false) can also be considered useful.

Optionally, the statistical significance is calculated by employing statistical hypothesis testing, which determines whether or not the result of the current research work is statistically significant. Optionally, the statistical significance is calculated as a p-value representing a probability that random chance could explain the result. It will be appreciated that in general, a p-value of 5% or lower is considered to be statistically significant. Alternatively, optionally, the statistical significance is calculated as a percentage value or a fractional value.

Furthermore, pursuant to embodiments of the present disclosure, the assessment is determined based upon the association factor, the status factor, and optionally, at least one of the reputation factor, the cost factor or the statistical-significance factor. Thus, the system is capable of determining the assessment value, based upon various factors that are relevant to the document. As a result, the system facilitates a fair assessment of the document.

For illustration purposes only, there will now be considered an example network environment, wherein a system configured to determine an assessment value of a document can be implemented pursuant to embodiments of the present disclosure. One such network environment has been illustrated in conjunction with FIG. 1 as explained in more detail below.

The network environment includes a plurality of client devices associated with a plurality of users, a server arrangement of the system, a database arrangement associated with the server arrangement, and a data communication network. The server arrangement comprises a processor communicably coupled via the data communication network with the plurality of client devices. Optionally, the network environment also includes a plurality of database servers communicably coupled via the data communication network with the processor of the server arrangement.

It will be appreciated that it is not necessary for the processor of the server arrangement to be coupled in communication with all the client devices simultaneously at all times.

The data communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

Examples of the client devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, large-sized touch screens with embedded PCs, a server, and Network-Attached Storage (NAS) devices.

The processor of the server arrangement is configured to execute machine readable instructions that cause the server arrangement to perform operations, for example, as illustrated with respect to the aforementioned first aspect.

In a second aspect, an embodiment of the present disclosure provides a method of determining an assessment value of a document, the document being related to a current research work of one or more researchers, the method being implemented via a computer system, the computer system comprising a server arrangement comprising a processor communicably coupled via a data communication network with a client device, the method comprising:

obtaining, from the client device, information pertaining to the document, and processing the information pertaining to the document to identify a technical field of the current research work and to identify entities and semantic inter-relationships specific to the current research work;

accessing information indicative of entities and semantic inter-relationships specific to a previous research work of at least one of the one or more researchers;

comparing the entities and the semantic inter-relationships specific to the current research work with the entities and the semantic inter-relationships specific to the previous research work to determine an association factor indicative of one or more of: an existence of and/or an extent of an association between the current research work and the previous research work of the one or more researchers;

accessing information indicative of entities and semantic inter-relationships related to the technical field of the current research work;

comparing the entities and the semantic inter-relationships specific to the current research work with the entities and the semantic inter-relationships related to the technical field to determine a status factor associated with the document, wherein the status factor is related to a novelty of the document with respect to the knowledge available publicly; and determining the assessment value of the document, based at least upon the association factor and the status factor.

The present disclosure also relates to the method as described above. Various embodiments and variants disclosed above, with respect to the aforementioned first aspect, apply mutatis mutandis to the method.

Optionally, the method further comprises determining a confidence score associated with the assessment value of the document to validate an accuracy of the assessment value.

Optionally, the method further comprises:
obtaining, from the client device or from at least one database server, information about the one or more researchers; and processing the information about the one or more researchers to determine a reputation factor associated with the document, wherein the step of determining the assessment value is performed based upon the reputation factor.

Optionally, the method further comprises:
obtaining, from the client device, information pertaining to cost incurred in the current research work of the one or more researchers; and processing the information pertaining to the cost to determine a cost factor associated with the document,
wherein the step of determining the assessment value is performed based upon the cost factor.

Optionally, the method further comprises:
obtaining, from the client device, information about a statistical significance of the current research work and information about a research organization where the current research work has been performed; and processing the information about the statistical significance, whilst taking into account a rank of the research organization, to determine a statistical-significance factor associated with the document, wherein the step of determining the assessment value is performed based upon the statistical-significance factor.

Moreover, optionally, the method further comprises:
generating a current-work graph representing the entities and the semantic inter-relationships specific to the current research work;

generating a knowledge graph representing the entities and the semantic inter-relationships related to the technical field of the current research work, based upon the information indicative of the entities and the semantic inter-relationships related to the technical field of the current research work; and generating a previous-work graph representing the entities and the semantic inter-relationships specific to the previous research work, based upon the information indicative of the entities and the semantic inter-relationships specific to the previous research work of the at least one of the one or more researchers, wherein the steps of comparing are performed using the current-work graph, the previous-work graph and the knowledge graph.

Optionally, the method further comprises:
obtaining, from a plurality of database servers, a plurality of documents pertaining to the technical field of the current research work;

processing the plurality of documents to identify the entities and the semantic inter-relationships related to the technical field; and storing the information indicative of the entities and the semantic inter-relationships related to the technical field.

Optionally, in this regard, the method further comprises assigning weights to the semantic inter-relationships related to the technical field, based upon at least one of: types of causal relationships represented by the semantic inter-relationships between the entities, the number of documents in which the semantic inter-relationships occurred, ranks of digital libraries where the documents were published.

Moreover, optionally, the method further comprises assigning weights to the semantic inter-relationships specific to the current research work, based upon the weights of the semantic inter-relationships related to the technical field.

Furthermore, optionally, the method further comprises:

obtaining, from a plurality of database servers, other documents authored by the at least one of the one or more researchers;

processing the other documents to identify the entities and the semantic inter-relationships specific to the previous research work; and storing the information indicative of the entities and the semantic inter-relationships specific to the previous research work.

Optionally, in this regard, the method further comprises assigning weights to the semantic inter-relationships specific to the previous research work, based upon at least one of: types of causal relationships represented by the semantic inter-relationships between the entities, the number of documents authored by the at least one of the one or more researchers in which the semantic inter-relationships occurred, ranks of digital libraries where the documents were published.

In a third aspect, an embodiment of the present disclosure provides a computer program product for determining an assessment value of a document, wherein the document is related to a current research work of one or more researchers, the computer program product comprising a non-transitory machine-readable data storage medium having stored thereon program instructions that, when accessed by a processing device, cause the processing device to:

obtain information pertaining to the document, and process the information pertaining to the document to identify a technical field of the current research work and to identify entities and semantic inter-relationships specific to the current research work;

access information indicative of entities and semantic inter-relationships specific to a previous research work of at least one of the one or more researchers;

compare the entities and the semantic inter-relationships specific to the current research work with the entities and the semantic inter-relationships specific to the previous research work to determine an association factor indicative of one or more of: an existence of and/or an extent of association between the current research work and the previous research work of the one or more researchers;

access information indicative of entities and semantic inter-relationships related to the technical field of the current research work;

compare the entities and the semantic inter-relationships specific to the current research work with the entities and the semantic inter-relationships related to the technical field to determine a status factor associated with the document, wherein the status factor is related to a novelty of the document with respect to the knowledge available publicly; and determine the assessment value of the document, based at least upon the association factor and the status factor.

DETAILED DESCRIPTION OF THE DRAWINGS

Referring now to the drawings, particularly by their reference numbers, FIG. 1 is a schematic illustration of a network environment 100, wherein a system configured to determine an assessment value of a document is implemented pursuant to embodiments of the present disclosure.

The network environment 100 includes a plurality of client devices (depicted as client devices 102a, 102b and 102c) associated with a plurality of users, a server arrangement 104 of the system, a database arrangement 106 associated with the server arrangement 104, and a data communication network 108. The server arrangement 104 comprises a processor 110 communicably coupled via the data communication network 108 with the client devices 102a, 102b and 102c. Optionally, the network environment 100 also includes a plurality of database servers (depicted as database servers 112a and 112b) communicably coupled via the data communication network 108 with the processor 110 of the server arrangement 104.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of server arrangements, client devices, database arrangements, data communication networks and database servers. A person skilled in the art will recognize many variations, alternatives, and modifications of embodiments of the present disclosure.

FIGS. 2A and 2B are example views of a graphical user interface that are presented to a user, in accordance with an embodiment of the present disclosure. The graphical user interface allows the user to provide the information pertaining to the document.

With reference to FIG. 2A, a first example view includes text boxes and/or drop-down menus that allow the user to enter details and/or select a suitable option.

With reference to FIG. 2B, a second example view allows the user to select one or more documents for submission.

FIGS. 2A and 2B are merely examples, which should not unduly limit the scope of the claims herein. A person skilled in the art will recognize many variations, alternatives, and modifications of embodiments of the present disclosure. For example, another example view of the graphical user interface can show and allow the user to edit the information provided by the user.

FIGS. 3A, 3B, 3C and 3D are schematic illustrations of a current-work graph and how the current-work graph is compared with a knowledge graph and a previous-work graph, in accordance with an embodiment of the present disclosure.

Figure 3A:
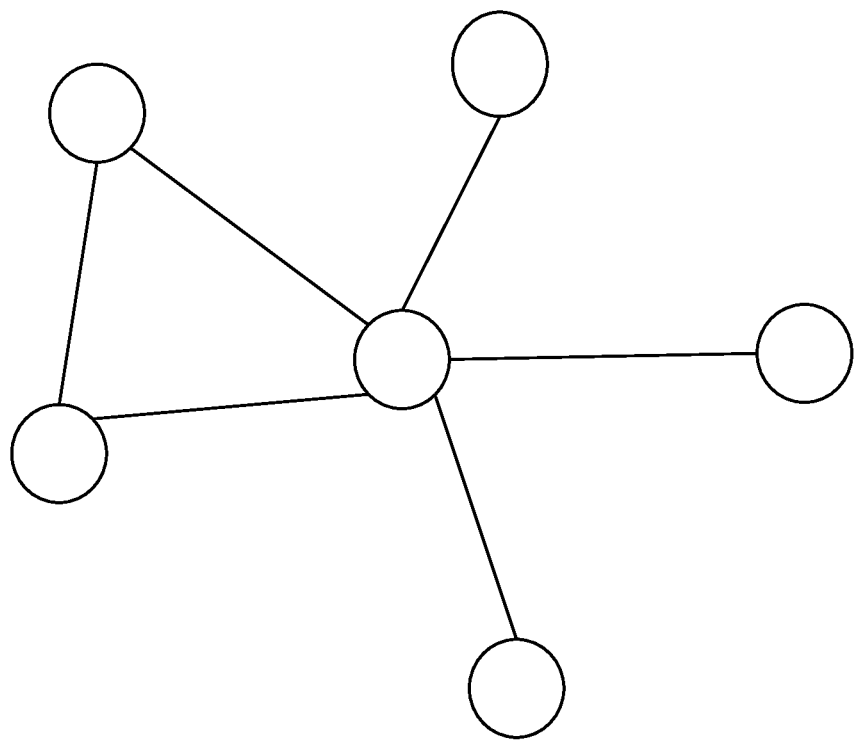
FIGS. 3A, 3B, 3C and 3D are schematic illustrations of a current-work graph and how the current-work graph is compared with a knowledge graph and a previous-work graph, in accordance with an embodiment of the present disclosure.

In FIG. 3A, there is shown an example current-work graph, wherein nodes of the example current-work graph represent entities specific to a current research work of one or more researchers, while edges between the nodes represent semantic inter-relationships between the entities specific to the current research work.

Figure 3B:
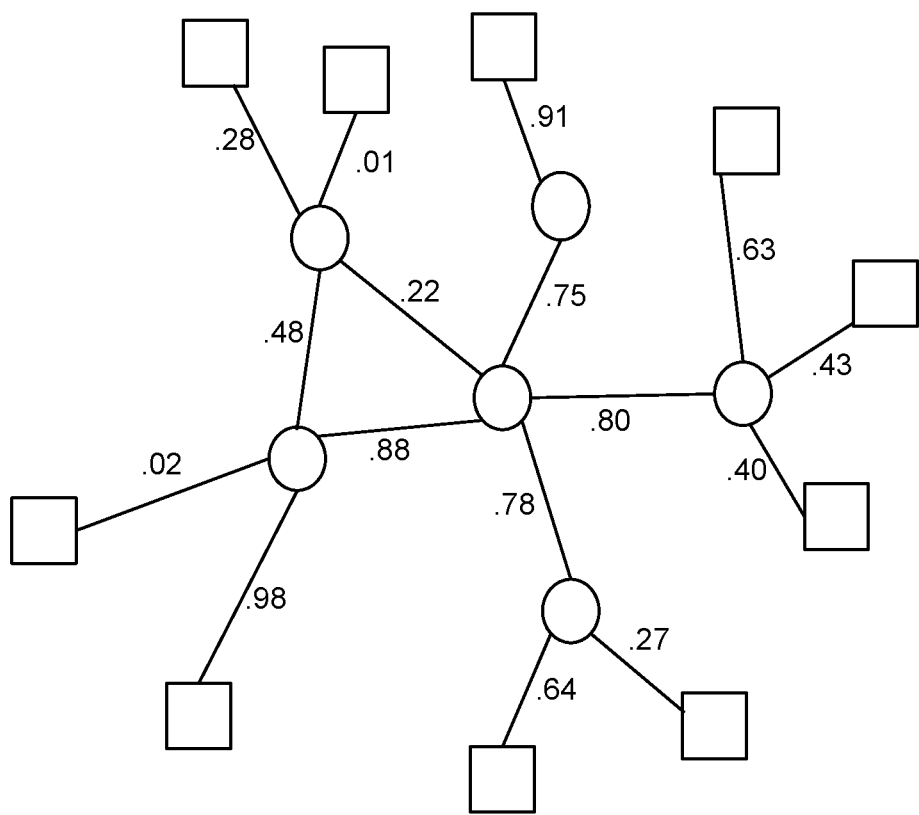

With reference to FIG. 3B, there is shown a portion of an example knowledge graph that is found to match the example current-work graph, based upon a comparison between the example current-work graph and the example knowledge graph. In FIG. 3B, circles represent nodes that are common between the example current-work graph and the example knowledge graph, while squares represent nodes of the example knowledge graph that do not exist in the example current-work graph.

The edges of the example knowledge graph are assigned weights, for example, as described earlier. In FIG. 3B, the weights are shown adjacent to their respective edges; the weights lie between 0 and 1.

Figure 3C:
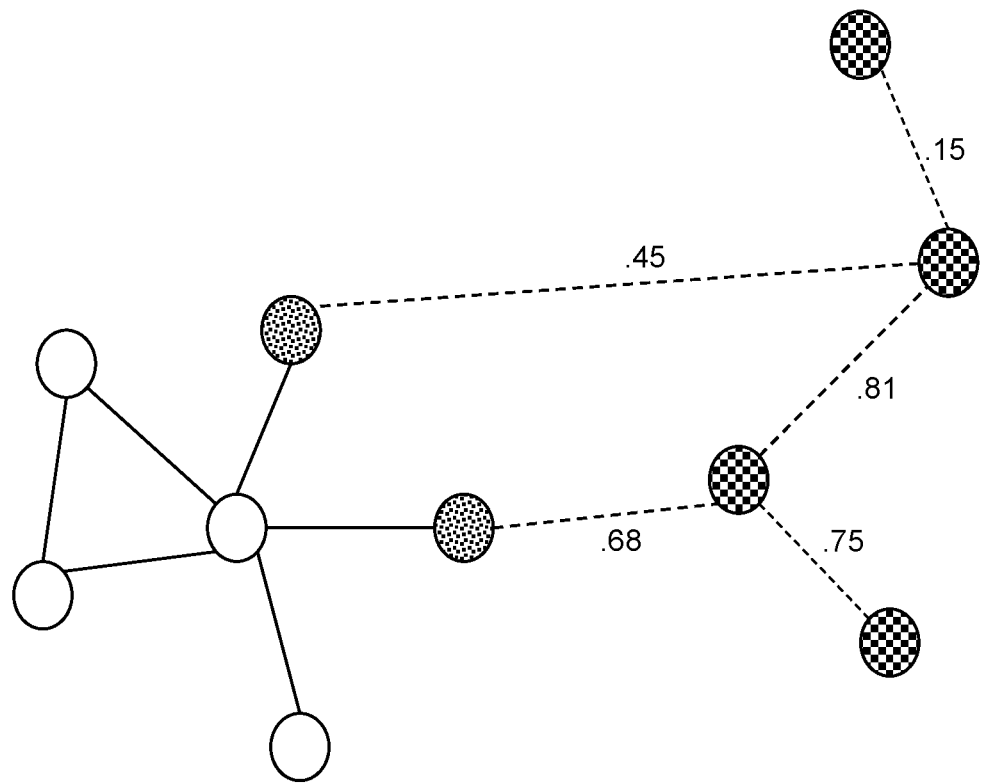

With reference to FIG. 3C, there is shown how the example current-work graph is associated with an example previous-work graph, based upon a comparison between the example current-work graph and the example previous-work graph. As shown in FIG. 3C, some nodes are found to be common between the example current-work graph and the example previous-work graph.

The edges of the example previous-work graph are assigned weights, for example, as described earlier. In FIG. 3C, the weights are shown adjacent to their respective edges; the weights lie between 0 and 1.

Optionally, for each edge belonging to the current-work graph, a probability of that edge given the previous-work graph is calculated, as described earlier.

Figure 3D:
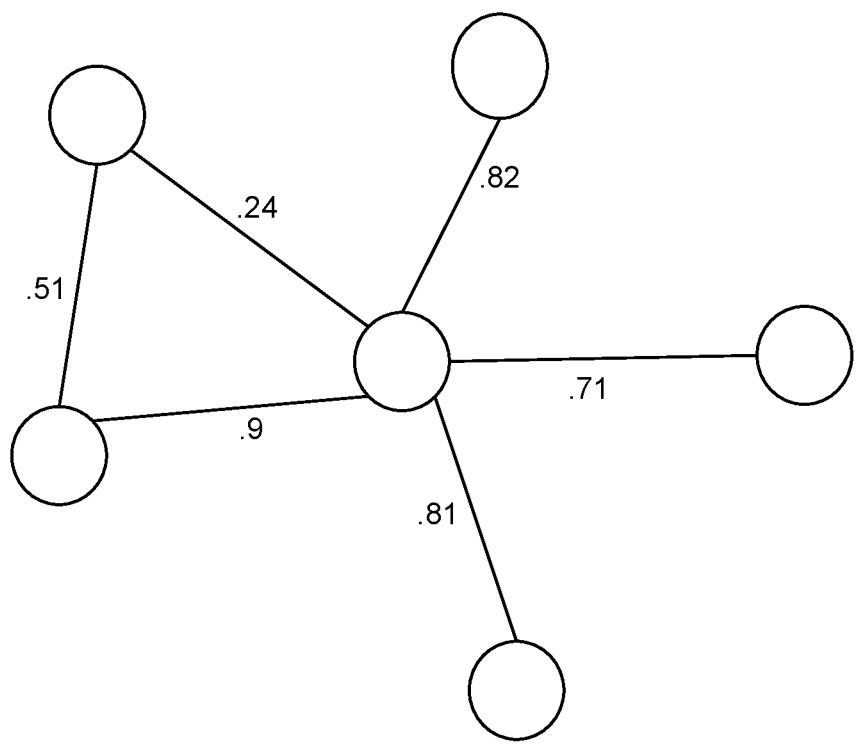

With reference to FIG. 3D, the edges of the example current-work graph are assigned weights, for example, as described earlier. In FIG. 3D, the weights are shown adjacent to their respective edges; the weights lie between 0 and 1.

FIGS. 3A, 3B, 3C and 3D are merely examples, which should not unduly limit the scope of the claims herein. A person skilled in the art will recognize many variations, alternatives, and modifications of embodiments of the present disclosure.

Figure 4:
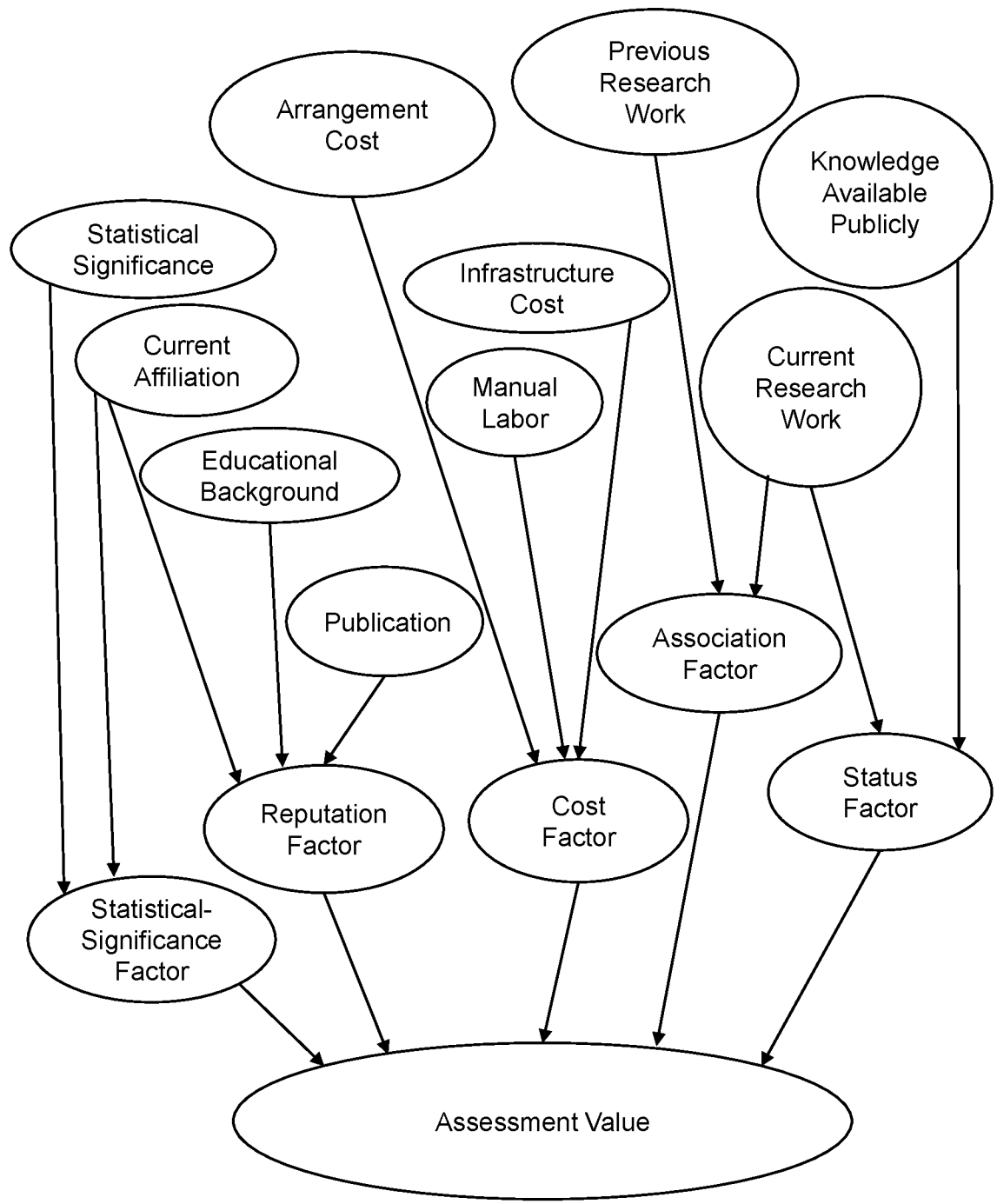
FIG. 4 is a schematic illustration of a data flow diagram representing variables associated with a document that are provided as an input to determine an assessment value of the document, in accordance with a specific embodiment of the present disclosure.

FIG. 4 is a schematic illustration of a data flow diagram representing variables associated with a document that are provided as an input (for example, to a neural network used by the system) to determine an assessment value of the document, in accordance with a specific embodiment of the present disclosure. In this embodiment, the assessment value is determined based upon various factors associated with the document, including an association factor, a status factor, a reputation factor, a cost factor and a statistical-significance factor.

It will be appreciated that the system pursuant to embodiments of the present disclosure is capable of determining the assessment value even when some information (and metainformation) pertaining to the document is not supplied by the user.

Figure 5A:
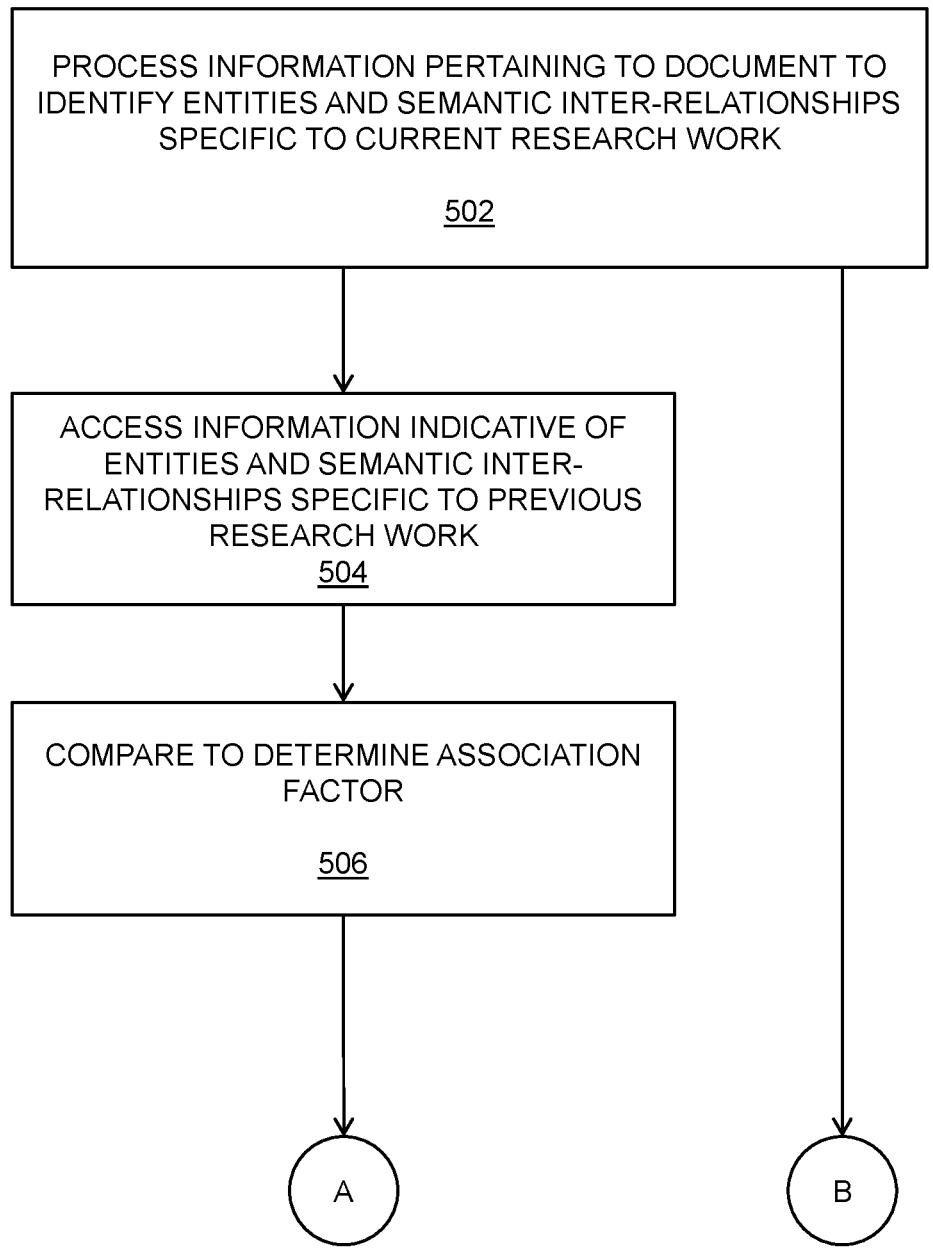
FIGS. 5A and 5B collectively illustrate steps of a method of determining an assessment value of a document, in accordance with an embodiment of the present disclosure.
Figure 5B:
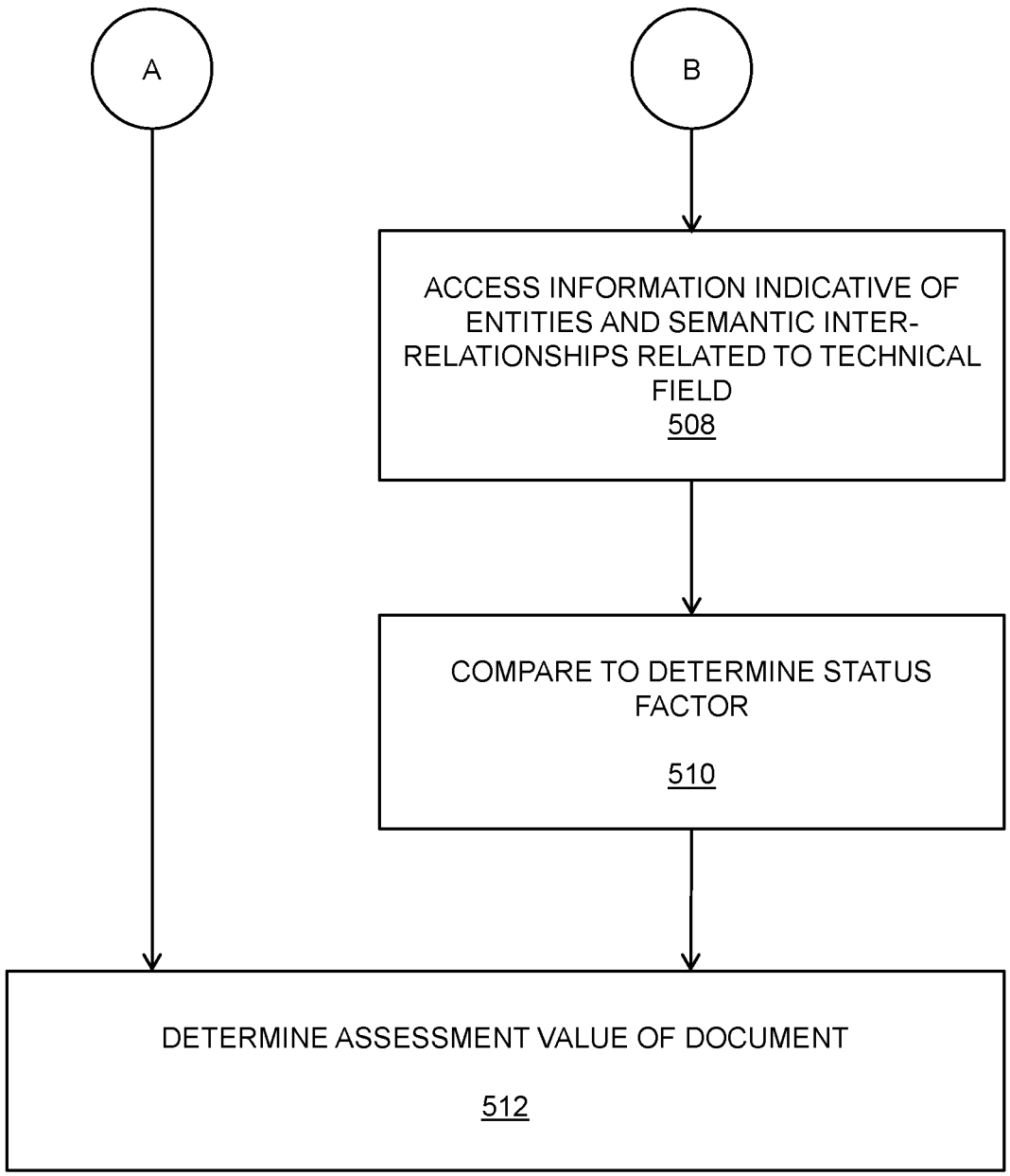

Referring to FIGS. 5A and 5B collectively, illustrated are steps of a method of determining an assessment value of a document, in accordance with an embodiment of the present disclosure. The method is depicted as a collection of steps in a logical flow diagram, which represents a sequence of steps that can be implemented in hardware, software, or a combination thereof, for example as aforementioned.

The document is related to a current research work of one or more researchers. The method is implemented via a computer system, the computer system comprising a server arrangement comprising a processor communicably coupled via a data communication network with a client device.

At a step 502, information pertaining to the document is obtained from the client device, and processed to identify a technical field of the current research work and to identify entities and semantic inter-relationships specific to the current research work.

At a step 504, information indicative of entities and semantic inter-relationships specific to a previous research work of at least one of the one or more researchers is accessed.

At a step 506, the entities and the semantic inter-relationships specific to the current research work are compared with the entities and the semantic inter-relationships specific to the previous research work to determine an association factor indicative of one or more of: an existence of and/or an extent of an association between the current research work and the previous research work of the one or more researchers.

At a step 508, information indicative of entities and semantic inter-relationships related to the technical field of the current research work is accessed.

At a step 510, the entities and the semantic inter-relationships specific to the current research work are compared with the entities and the semantic inter-relationships related to the technical field to determine a status factor associated with the document, wherein the status factor is related to a novelty of the document with respect to the knowledge available publicly.

At a step 512, the assessment value of the document is determined based at least upon the association factor and the status factor.

Optionally, the steps 508 and 510 can be performed before or in parallel with the steps 504 and 506.

The steps 502 to 512 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system configured to determine an assessment value of a document, the document being related to a current research work of one or more researchers, the system comprising a server arrangement comprising a processor communicably coupled via a data communication network with a client device, wherein the processor of the server arrangement is configured to execute machine readable instructions that cause the server arrangement to:

obtain, from the client device, information pertaining to the document, and process the information pertaining to the document, at the client device, to identify a technical field of the current research work and to identify entities and semantic inter-relationships specific to the current research work, wherein the information pertaining to the document comprises at least one of: an abstract of the document, a hypothesis of the current research work, a brief note provided as an input by a user, or any set of information, which is indicative of entities and semantic inter-relationships between the entities as mentioned in the document;

generate a current-work graph representing the entities and the semantic inter-relationships specific to the current research work;

access information indicative of entities and semantic inter-relationships specific to a previous research work of at least one of the one or more researchers;

generate a previous-work graph representing the entities and the semantic inter-relationships specific to the previous research work, based upon the information indicative of the entities and the semantic inter-relationships specific to the previous research work of the at least one of the one or more researchers;

compare the entities and the semantic inter-relationships specific to the current research work with the information indicative of entities and the semantic inter-relationships specific to the previous research work by unifying the current-work graph and the previous-work graph into a unified graph to determine an association factor indicative of one or more of: an existence of and/or an extent of an association between the current research work and the previous research work of the one or more researchers;

access information indicative of entities and semantic inter-relationships related to the technical field of the current research work;

generate a knowledge graph representing the entities and the semantic inter-relationships related to the technical field of the current research work, based upon the information indicative of the entities and the semantic inter-relationships related to the technical field of the current research work;

compare the entities and the semantic inter-relationships specific to the current research work with the entities and the semantic inter-relationships related to the technical field to determine a status factor associated with the document by employing a link prediction technique, wherein the status factor is a measure of an actual contribution of the current research work of the one or more researchers to the knowledge available publicly, including information that is being contributed and conveyed by the document, and wherein the status factor is determined by calculating a probability of the current research work given the knowledge available publicly;

determine the assessment value of the document, based at least upon the association factor and the status factor, wherein the assessment value is determined using a neural network, and wherein labeled training data is employed to train the neural network;

access assessment values of a plurality of documents related to the technical field of the current research work; and sort the document and the plurality of documents based on the determined assessment value of the document and the accessed assessment values of the other documents.

2. The system of claim 1, wherein the processor of the server arrangement is configured to execute machine readable instructions that cause the server arrangement to determine a confidence score associated with the assessment value of the document to validate an accuracy of the assessment value.

3. The system of claim 1, wherein the processor of the server arrangement is configured to execute machine readable instructions that cause the server arrangement to determine the assessment value of the document using at least one of: a statistical analysis, machine learning, or a rule-based analysis.

4. The system of claim 1, wherein the processor of the server arrangement is configured to execute machine readable instructions that cause the server arrangement to:

obtain, from the client device or from at least one database server, information about the one or more researchers;

process the information about the one or more researchers to determine a reputation factor associated with the document; and determine the assessment value of the document, based upon the reputation factor.

5. The system of claim 1, wherein the processor of the server arrangement is configured to execute machine readable instructions that cause the server arrangement to:

obtain, from the client device, information pertaining to cost incurred in the current research work of the one or more researchers;

process the information pertaining to the cost to determine a cost factor associated with the document; and determine the assessment value of the document, based upon the cost factor.

6. The system of claim 1, wherein the processor of the server arrangement is configured to execute machine readable instructions that cause the server arrangement to:

obtain, from the client device, information about a statistical significance of the current research work and information about a research organization where the current research work has been performed;

process the information about the statistical significance, whilst taking into account a rank of the research organization, to determine a statistical-significance factor associated with the document; and determine the assessment value of the document, based upon the statistical-significance factor.

7. The system of claim 1, wherein the processor of the server arrangement is configured to execute machine readable instructions that cause the server arrangement to:

obtain, from a plurality of database servers, a plurality of documents pertaining to the technical field of the current research work;

process the plurality of documents to identify the entities and the semantic inter-relationships related to the technical field; and store the information indicative of the entities and the semantic inter-relationships related to the technical field.

8. The system of claim 7, wherein the processor of the server arrangement is configured to execute machine readable instructions that cause the server arrangement to assign weights to the semantic inter-relationships related to the technical field, based upon at least one of: types of causal relationships represented by the semantic inter-relationships between the entities, the number of documents in which the semantic inter-relationships occurred, ranks of digital libraries where the documents were published.

9. The system of claim 8, wherein the processor of the server arrangement is configured to execute machine readable instructions that cause the server arrangement to assign weights to the semantic inter-relationships specific to the current research work, based upon the weights of the semantic inter-relationships related to the technical field.

10. The system of claim 1, wherein the processor of the server arrangement is configured to execute machine readable instructions that cause the server arrangement to:

obtain, from a plurality of database servers, other documents authored by the at least one of the one or more researchers;

process the other documents to identify the entities and the semantic inter-relationships specific to the previous research work; and store the information indicative of the entities and the semantic inter-relationships specific to the previous research work.

11. The system of claim 10, wherein the processor of the server arrangement is configured to execute machine readable instructions that cause the server arrangement to assign weights to the semantic inter-relationships specific to the previous research work, based upon at least one of: types of causal relationships represented by the semantic inter-relationships between the entities, the number of documents authored by the at least one of the one or more researchers in which the semantic inter-relationships occurred, ranks of digital libraries where the documents were published.

12. The system of claim 1, wherein the technical field of the document is related to drug discovery.

13. The system of claim 1, wherein the assessment value is in a crypto-currency for enabling future transactions of the document using a blockchain.

14. The system according to claim 1, wherein the server arrangement is configured to use the determined assessment value to price the document when making the document available for sale.

15. The system according to claim 1 further comprising the server arrangement being configured to enable a sorting of different documents based on the determined assessment value.

16. A method of determining an assessment value of a document, the document being related to a current research work of one or more researchers, the method being implemented via a computer system, the computer system comprising a server arrangement comprising a processor communicably coupled via a data communication network with a client device, the method comprising:
   obtaining, from the client device, information pertaining to the document, and processing the information pertaining to the document, at the client device, to identify a technical field of the current research work and to identify entities and semantic inter-relationships specific to the current research work, wherein the information pertaining to the document comprises at least one of: an abstract of the document, a hypothesis of the current research work, a brief note provided as an input by a user, or any set of information, which is indicative of entities and semantic inter-relationships between the entities as mentioned in the document;
   generating a current-work graph representing the entities and the semantic inter-relationships specific to the current research work;
   accessing information indicative of entities and semantic inter-relationships specific to a previous research work of at least one of the one or more researchers;
   generating a previous-work graph representing the entities and the semantic inter-relationships specific to the previous research work, based upon the information indicative of the entities and the semantic inter-relationships specific to the previous research work of the at least one of the one or more researchers,
   comparing the entities and the semantic inter-relationships specific to the current research work with the information indicative of entities and the semantic inter-relationships specific to the previous research work by unifying the current-work graph and the previous-work graph into a unified graph to determine an association factor indicative of one or more of: an existence of and/or an extent of an association between the current research work and the previous research work of the one or more researchers;
   accessing information indicative of entities and semantic inter-relationships related to the technical field of the current research work;
   generating a knowledge graph representing the entities and the semantic inter-relationships related to the technical field of the current research work, based upon the information indicative of the entities and the semantic inter-relationships related to the technical field of the current research work; and
   comparing the entities and the semantic inter-relationships specific to the current research work with the entities and the semantic inter-relationships related to the technical field to determine a status factor associated with the document by employing a link prediction technique, wherein the status factor is measure of an actual contribution of the current research work of the one or more researchers to the knowledge available publicly, including information that is being contributed and conveyed by the document, and wherein the status factor is determined by calculating a probability of the current research work given the knowledge available publicly;
   determining the assessment value of the document, based at least upon the association factor and the status factor, wherein the assessment value is determined using a neural network, and wherein labeled training data is employed to train the neural network;
   accessing assessment values of plurality of documents related to the technical field of the current research work; and
   sorting different the documents and the plurality of documents based on the determined assessment value of the document and the accessed assessment values of the other documents.

17. The method of claim 16, further comprising determining a confidence score associated with the assessment value of the document to validate an accuracy of the assessment value.

18. The method of claim 16, further comprising:
   obtaining, from the client device or from at least one database server, information about the one or more researchers; and
   processing the information about the one or more researchers to determine a reputation factor associated with the document, wherein the step of determining the assessment value is performed based upon the reputation factor.

19. The method of claim 16, further comprising:
   obtaining, from the client device, information pertaining to cost incurred in the current research work of the one or more researchers; and
   processing the information pertaining to the cost to determine a cost factor associated with the document,
wherein the step of determining the assessment value is performed based upon the cost factor.

20. The method of claim 16, further comprising:
   obtaining, from the client device, information about a statistical significance of the current research work and information about a research organization where the current research work has been performed; and
   processing the information about the statistical significance, whilst taking into account a rank of the research organization, to determine a statistical-significance factor associated with the document, wherein the step of determining the assessment value is performed based upon the statistical-significance factor.

21. The method of claim 16, further comprising:
obtaining, from a plurality of database servers, a plurality of documents pertaining to the technical field of the current research work;
processing the plurality of documents to identify the entities and the semantic inter-relationships related to the technical field; and
storing the information indicative of the entities and the semantic inter-relationships related to the technical field.

22. The method of claim 21, further comprising assigning weights to the semantic inter-relationships related to the technical field, based upon at least one of: types of causal relationships represented by the semantic inter-relationships between the entities, the number of documents in which the semantic inter-relationships occurred, ranks of digital libraries where the documents were published.

23. The method of claim 22, further comprising assigning weights to the semantic inter-relationships specific to the current research work, based upon the weights of the semantic inter-relationships related to the technical field.

24. The method of claim 16, further comprising:
obtaining, from a plurality of database servers, other documents authored by the at least one of the one or more researchers;
processing the other documents to identify the entities and the semantic inter-relationships specific to the previous research work; and
storing the information indicative of the entities and the semantic inter-relationships specific to the previous research work.

25. The method of claim 24, further comprising assigning weights to the semantic inter-relationships specific to the previous research work, based upon at least one of: types of causal relationships represented by the semantic inter-relationships between the entities, the number of documents authored by the at least one of the one or more researchers in which the semantic inter-relationships occurred, ranks of digital libraries where the documents were published.

26. A computer program product for determining an assessment value of a document, wherein the document is related to a current research work of one or more researchers, the computer program product comprising a non-transitory machine-readable data storage medium having stored thereon program instructions that, when accessed by a processing device, cause the processing device to:
obtain information pertaining to the document, and process the information pertaining to the document, at the client device, to identify a technical field of the current research work and to identify entities and semantic inter-relationships specific to the current research work, wherein the information pertaining to the document comprises at least one of: an abstract of the document, a hypothesis of the current research work, a brief note provided as an input by a user, or any set of information, which is indicative of entities and semantic inter-relationships between the entities as mentioned in the document;
generate a current-work graph representing the entities and the semantic inter-relationships specific to the current research work;
access information indicative of entities and semantic inter-relationships specific to a previous research work of at least one of the one or more researchers;
generate a previous-work graph representing the entities and the semantic inter-relationships specific to the previous research work, based upon the information indicative of the entities and the semantic inter-relationships specific to the previous research work of the at least one of the one or more researchers;
compare the entities and the semantic inter-relationships specific to the current research work with the information indicative of entities and the semantic inter-relationships specific to the previous research work by unifying the current-work graph and the previous-work graph into a unified graph to determine an association factor indicative of one or more of: an existence of and/or an extent of association between the current research work and the previous research work of the one or more researchers;
access information indicative of entities and semantic inter-relationships related to the technical field of the current research work;
generate a knowledge graph representing the entities and the semantic inter-relationships related to the technical field of the current research work, based upon the information indicative of the entities and the semantic inter-relationships related to the technical field of the current research work;
compare the entities and the semantic inter-relationships specific to the current research work with the information indicative of entities and the semantic inter-relationships related to the technical field to determine a status factor associated with the document by employing a link prediction technique, wherein the status factor is a measure of an actual contribution of the current research work of the one or more researchers to the knowledge available publicly, including information that is being contributed and conveyed by the document, and wherein the status factor is determined by calculating a probability of the current research work given the knowledge available publicly;
determine the assessment value of the document, based at least upon the association factor and the status factor, wherein the assessment value is determined using a neural network, and wherein labeled training data is employed to train the neural network;
access assessment values of a plurality of documents related to the technical field of the current research work; and
sort the document and the plurality of different documents based on the determined assessment value of the document and the accessed assessment values of the other documents.

* * * * *